United States Patent
Wacquez et al.

(10) Patent No.: US 9,991,892 B2
(45) Date of Patent: Jun. 5, 2018

(54) ELECTRONIC DEVICE HAVING A PHYSICAL UNCLONABLE FUNCTION IDENTIFIER

(71) Applicant: COMMISSARIAT A L'ENERGIE ATOMIQUE ET AUX ENERGIES ALTERNATIVES, Paris (FR)

(72) Inventors: Romain Wacquez, Albany, NY (US); Jacques Fournier, Simiane-Collongue (FR); Carlo Reita, Saint Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days. days.

(21) Appl. No.: 15/600,331

(22) Filed: May 19, 2017

(65) Prior Publication Data
US 2017/0338819 A1 Nov. 23, 2017

(30) Foreign Application Priority Data
May 20, 2016 (FR) .................. 16 54544

(51) Int. Cl.
*H01L 23/00* (2006.01)
*H03K 19/003* (2006.01)
(Continued)

(52) U.S. Cl.
CPC ....... *H03K 19/00315* (2013.01); *G06F 21/44* (2013.01); *H01L 23/576* (2013.01); *H01L 27/1104* (2013.01)

(58) Field of Classification Search
CPC ... H03K 19/00315; G06F 21/30; G06F 21/44; G06F 21/45; H01L 23/57; H01L 23/576
See application file for complete search history.

(56) References Cited

U.S. PATENT DOCUMENTS 6,161,213 A * 12/2000 Lofstrom .............. H01L 23/544
257/E23.179
2003/0204743 A1* 10/2003 Devadas ................ G06F 21/31
726/9
(Continued)

FOREIGN PATENT DOCUMENTS

WO WO 00/49538 A1 8/2000

OTHER PUBLICATIONS

French Preliminary Search Report dated Feb. 21, 2017 in French Application 16 54544 filed on May 20, 2016 (with English Translation of Categories of Cited Documents).
Daniel E. Holcomb et al., "Power-Up SRAM State as an Identifying Fingerprint and Source of True Random Numbers," IEEE Transactions on Computers, vol. 58, No. 9, Sep. 2009, pp. 13.
(Continued)

*Primary Examiner* — Jason M Crawford
(74) *Attorney, Agent, or Firm* — Oblon, McClelland, Maier & Neustadt, L.L.P.

(57) ABSTRACT

Electronic device comprising at least:
a plurality of MOSFET FD-SOI type transistors among which the first transistors are such that each first transistor comprises a channel in which a concentration of the same type of dopants as those present in the source and drain of said first transistor is greater than the concentration in the channel of each of the other transistors in said plurality of transistors; and
an identification circuit capable of determining a unique identifier of the electronic device starting from at least one intrinsic electrical characteristic of each of the first transistors, the value of which depends at least partly on the conductance of said first transistor;
and in which the length of a gate of each of the first transistors is less than or equal to about 20 nm.

12 Claims, 3 Drawing Sheets

(51) Int. Cl.
*H01L 27/11* (2006.01)
*G06F 21/44* (2013.01)

(56) References Cited

U.S. PATENT DOCUMENTS

| | | | |
|---|---|---|---|
| 2005/0275001 A1 | 12/2005 | Heessels | |
| 2012/0326752 A1 | 12/2012 | Hook et al. | |
| 2013/0233608 A1* | 9/2013 | Feng | H04L 9/3278 174/264 |
| 2014/0042628 A1* | 2/2014 | Edelstein | H01L 23/52 257/758 |
| 2015/0222430 A1* | 8/2015 | Kim | H04L 9/0866 380/44 |
| 2016/0329287 A1* | 11/2016 | Li | H01L 23/576 |
| 2017/0263575 A1* | 9/2017 | Cao | H01L 23/576 |
| 2017/0310688 A1* | 10/2017 | Lecomte | H04L 63/1416 |

OTHER PUBLICATIONS

Clemens Helfmeier et al., "Cloning Physically Unclonable Functions," 2013 IEEE International Symposium on Hardware-Oriented Security and Trust, Jun. 2013, pp. 6.
Roel Maes et al., "A Soft Decision Helper Data Algorithm for SRAM PUFs," Information Theory, ISIT 2009. IEEE International Symposium on, DOI 10.1109/ISIT.2009.5205263, 2009, pp. 5.
Rathnamala Rao et al., "Study of Random Dopant Fluctuation Effects in FD-SOI MOSFET Using Analytical Threshold Voltage Model," IEEE Transactions on Device and Materials Reliability, vol. 10, No. 2, Jun. 2010, pp. 7.
U.S. Appl. No. 14/575,329, filed Dec. 18, 2014, 2015/0179474 A1, Sylvain Maitrejean et al.
U.S. Appl. No. 15/510,425, filed Mar. 10, 2017, Maxime Lecomte et al.

* cited by examiner

ELECTRONIC DEVICE HAVING A PHYSICAL UNCLONABLE FUNCTION IDENTIFIER

TECHNICAL DOMAIN AND PRIOR ART

The invention relates to the domain of security and the identification of electronic devices such as electronic chips and/or electronic integrated circuits, used particularly in on-board systems or connected objects (IoT, or "Internet of Things").

An approach called PUF ("Physically Unclonable Function") by which an electronic circuit or chip can be securely and uniquely identified or authenticated consists of identifying unique characteristics specific to this circuit to identify this circuit, in the same way as digital fingerprints of a person. Ideally, these characteristics must be stable in time (resistant to ageing), stable under variations in measurement conditions (current, voltage and external/environmental measurement conditions such as temperature), and be impossible to duplicate physically or mathematically (in other words through the creation of a mathematical model capable of replacing physical elements with unique characteristics). Any manipulation or modification to the circuit or the chip must also modify these characteristics so that reading this identifier can guarantee integrity of the circuit or the chip. Thus, a malicious manipulation to the circuit or the chip must be unable to duplicate this PUF function, or to alter the results of this function (without destroying the entire chip).

A first solution to make such identification possible consists of including electronic components in the circuit capable of generating a variable delay strictly different in every circuit as a result of variations in intra-wafer, intra-batch and batch-to-batch fabrication processes. The value of this delay corresponds to a unique identifier. For example, these electronic components form one or several ring oscillators dedicated to this identification.

The disadvantages of this first solution are that the measured delay is unstable, particularly with changing temperature, and that these electronic components can be modelled mathematically using learning methods.

A second solution for making such an identification consists of using memory elements (SRAM cells) in the circuit and considering that the memory states in which these memory elements are initialised (metastability states) together form the identifier of the circuit. For example, a solution of this type is disclosed in the document by D. E. Holcomb et al., <<Power-Up SRAM State as an Identifying Fingerprint and Source of True Random Numbers>>, IEEE Transactions on Computers, vol. 58, No. 9, September 2009.

However, this solution has the disadvantage that the memory elements used to generate this identifier are sensitive to current, voltage and temperature variations applied to these memory elements, and to variations related to ageing of the circuit. This solution also requires the use of important error correction codes and post-processing algorithms that are expensive to implement and that also introduce security problems because they make this solution vulnerable to software attacks (since post-processing can be attacked by physical attacks such as espionage of auxiliary channels or injection of faults, to obtain the measured PUF value invasively.

Furthermore, in such memory elements, there is a correlation between the metastable states of a line of memory cells powered by the same electrical power supply line. Therefore the generated identifier is predictable to some extent, which is not desirable for a PUF type identifier. Finally, there are also invasive attacks through which memory cells can be cloned, as described in the document "Cloning Physically Unclonable Functions" by C. Helfmeier et al., Hardware-Oriented Security and Trust (HOST), 2013 IEEE International Symposium on Jun. 2-3 2013, pages 1-6.

PRESENTATION OF THE INVENTION

Therefore there is a need to disclose an electronic device that can be identified or authenticated through a PUF type of identification or authentication that does not have the disadvantages mentioned above, in other words that enables identification through an identifier that is stable in time and stable under voltage, current and temperature variations that might be applied to the electronic device, that is not predictable, that reduces the need for error correction codes and that reduces security risks facing physical attacks and modelling.

One embodiment includes an electronic device for this purpose comprising at least the following:

a plurality of MOSFET transistors among which the first transistors are such that each first transistor comprises a channel in which a concentration of the same type (conductivity) of dopants as those present in the source and drain of said first transistor is greater than the concentration in the channel of each of the other transistors in said plurality of transistors of the same type of conductivity as said first transistor; and an identification circuit capable of determining a unique identifier of the electronic device starting from at least one intrinsic electrical characteristic of each of the first transistors, the value of which depends at least partly on the conductance of said first transistor.

Therefore, very slight doping is intentionally added into the channels of the first transistors, this doping being of the N type for NMOS type transistors and of the P type for PMOS transistors. The concentration of these added dopants may be of the order of $1 \times 10^{18}$ at/cm$^3$ or between about $5 \times 10^{17}$ at/cm$^3$ and $8.10^{18}$ at/cm$^3$.

By doping the channels of the first transistors (those that will be used to generate the identifier of the device) with exactly the same type as the carriers present in the source and drain zones of each of these first transistors, the mismatch (due to local differences or variations between one transistor and another) increases. Therefore the increase in this mismatch can be used to make a good differentiation of the electrical characteristics between the transistors used to determine the unique identifier. Thus, the identification made is much more stable when subjected to possible variations on the voltages, currents and temperatures that can be applied to the electronic device.

Therefore this increase in the stability of the identification strongly reduces the need for error correction codes if the device makes use of such codes.

Moreover, the predictability of the identifier is strongly reduced because when the first transistors form memory cells that, with their initialisation states (in other words their states when the memory cells are powered up), define the device identifier, the increase in the mismatch of the transistors used for the identification leads to a greater decorrelation between metastable states of the memory cells.

Furthermore, due to this increase in the mismatch between transistors, the identification can be made using electrical characteristics of transistors other than those of the initial memory states of memory cells, for example values of currents circulating in these transistors.

The mismatch dose can be controlled depending on the level of doping in the channels of the first transistors.

Finally, unlike prior art, this solution reduces security risks facing physical attacks because, since the electronic device is made on an SOI substrate (FDSOI type MOSFET transistors) the presence of the buried dielectric (BOX) at the lower interface of transistors will increase the complexity of making observations of photonic emissions from the circuit and therefore its cloning.

Risks through modelling are also lower because the electrical characteristic of each transistor is determined by the implantation of a low dose of dopants in the channel. The concentration of dopants in the channel is then insufficient to cover atomic orbitals, and the distribution of dopants is discretised. This situation is the direct result of a purely stochastic process, namely ion implantation.

When these dopants added into the channels of the first transistors are of the N type (first transistors of the NMOS type), these dopants may be phosphorus and/or arsenic. When these dopants added into the channels of the first transistors are of the P type (first transistors of the PMOS type), these dopants may be boron and/or $BF_2$.

The transistors in said plurality of MOSFET transistors are of the FD-SOI type.

The FD-SOI transistors correspond to MOS transistors made on a semiconductor on insulator type substrate such as a silicon on insulator type substrate and are "Fully-Depleted" (FD).

In a classical FD-SOI transistor, the channel is said to be "intrinsic", in other words no dopant is added into the channel, neither for a P type transistor nor for an N type transistor. However there is a residual doping also called intrinsic doping, that is very weak, and occurs naturally in the semiconductor of the substrate used for their fabrication and that has no electrical impact on functioning of the FD-SOI transistor. This residual doping is usually P type doping and may for example be between about $1 \times 10^{15}$ at/cm$^3$ and $1 \times 10^{16}$ at/cm$^3$ (which corresponds to a negligible quantity of dopants because, for example, the typical volume of the channel of an FD-SOI transistor made using the 28 nm technology is about $3.2 \times 10^{-17}$ cm$^3$, which is between about 0.032 and 0.32 "single dopant" in a channel).

Thus, when the concentration of dopants added into the channels of the first transistors is, for example, of the order of $1 \times 10^{18}$ at/cm$^3$, this doping level is about 100 to 1000 times more than that naturally present in the channel of a PMOS transistor, in other words about 100 to 1000 times more than the intrinsic concentration of dopants in the substrate. In the case of an NMOS transistor, these dopants can be of the type opposite to the types naturally present in the channel of this transistor, and therefore are distinguished from these dopants that have opposite effects (electron donors and electron acceptors).

Such FD-SOI transistors have many electrical advantages in comparison with classical CMOS transistors, and have a better intrinsic mismatch. In other words, there are few local difference or variations between two FD-SOI transistors with the same design. However, by doping FD-SOI transistor channels that will be used to generate the identifier of the device, this mismatch increases strongly so that a good differentiation can be made between the electrical characteristics of FD-SOI transistors used to determine the unique identifier.

Thus, the unique nature of this identifier determined by the identification circuit is not due to variations specific to the fabrication method used to make the transistors, but to the variability added by doping the channels of FD-SOI transistors as mentioned above.

Finally, the use of FD-SOI transistors is also advantageous because such transistors are less sensitive to attacks from the back face of the substrate on which these transistors are made.

This electronic device may advantageously be made using the 28 nm technology, or at least for example the 14 nm FDSOI technology. The gate length of the first transistors in the electronic device in this case is less than or equal to about 20 nm so as to obtain electrical behaviours of transistors leading to the mismatch.

The distance separating so-called "isolated" dopants present in the channel, in other words of the same type as those present in the source and drain, from the buried dielectric layer (BOX) present under the channels of FD-SOI transistors is the source of random variations specific to the device. The proximity of the buried dielectric layer to these dopants modifies the ionisation energy of the dopants (principle of the image charge). There is then an infinite number of possibilities for the ionisation energy of an isolated dopant in an FD-SOI transistor, whereas with the bulk technology, the ionisation energy is the nominal value corresponding to an isolated dopant in an infinite homogeneous space.

In the device, the singularity of each first transistor is directly related to the combination of the architecture of the FD-SOI transistor (presence of the buried dielectric layer under the channel) and the fact that the length of the gate of the transistor is less than or equal to about 20 nm and that dopants of the same type as those present in the transistor source and drain are present in the channel.

As a variant, the transistors in said plurality of MOSFET transistors may be of the bulk type, in other words comprising active zones made in a solid semiconductor layer (for example with a thickness of more than about 10 μm) and/or the Fin-FET type.

Therefore when the transistors in said plurality of MOSFET transistors are of the bulk and/or FinFET type, the channels of these transistors comprise dopants of the type opposite to those present in the source and drain of these transistors (an NMOS transistor classically having a P doped channel and a PMOS transistor classically having an N doped channel). Among these transistors, in addition to dopants of the type opposite to the dopants present in the source and the drain, the channels of the first transistors comprise dopants of the same type as the dopants present in the source and the drain of these first transistors, which differentiates them from the other transistors in said plurality of transistors for which the channels comprise only dopants of the type opposite to those present in the source and the drain.

In a first embodiment, the identification circuit may be able to compare currents circulating in the first identically biased transistors two by two, the results of these comparisons will be used to form the unique identifier of the electronic device. Considering that doping of the channel modifies the conductance of a transistor, that itself varies as a function of the potential $V_G$ applied to the transistor gate, differences between the currents in the first identically biased transistors are particularly useful data to form the identifier of the electronic device.

Currents read by the identification circuit can correspond to currents $I_{ON}$ of the first transistors, in other words the current circulating between the transistor drain and source when $V_{GS}$ (gate-source voltage)=$V_{DS}$ (drain-source voltage)=Valim (transistor power supply voltage).

As a variant, comparisons made to obtain the identifier can be made on different electrical characteristics that can be obtained from the values of transistor drain-source currents rather than from these currents themselves, for example by comparing the threshold voltages of the first transistors, the values of which can be obtained from the values of currents circulating in the transistors (for example by dichotomy measuring the current $I_{ON}$ for different values of the voltage $V_G$ applied on the transistor gate).

In this case, the identification circuit may include at least:

a multiplexer comprising several inputs, each connected to the drain or the source of one of the first transistors, and two outputs; and a comparator comprising two inputs connected to two outputs from the multiplexer, capable of outputting a signal with a value that varies depending on the result of the comparison between the values of currents applied on comparator inputs.

Thus, the different possible combinations of two transistors among the set of first transistors can be used to obtain a large number of comparison results forming the unique identifier of the electronic device.

According to a second embodiment, the electronic device may be such that:

the first transistors form several SRAM memory cells, and the identification circuit is capable of reading an initial memory state of each of the SRAM memory cells formed by the first transistors, the initial memory states of said SRAM memories together forming the unique identifier of the electronic device.

In this second embodiment, due to the increased mismatch between the transistors that increases the stability of the initial states of the memory cells, the required error correction codes are then very much smaller.

Said concentration of dopants of the same type as the dopants present in the source and drain of said first transistor may be between about $5\times10^{17}$ and $8\times10^{18}$ at/cm$^3$, and for example of the order of $1\times10^{18}$ at/cm$^3$.

The gate of each first transistor may be shorter than the gate of each of the other transistors, in this case less than or equal to about 20 nm. Such first transistors are advantageous because the increased mismatch obtained is particularly important in this case.

The thickness of the active zone of each of the first transistors may be more than the thickness of the active zone of each of the other transistors, for example equal to or thicker than about 10 nm for FD-SOI transistors. Such first transistors are advantageous because the increased mismatch obtained is particularly important in this case. Moreover, the thickness of the active zone of each of the first transistors may be between about 5 nm and 20 nm, to assure that dopants in the channel are close to the buried dielectric layer.

The description also applies to a method of fabricating an electronic device, comprising at least the following steps:

fabricate a plurality of MOSFET transistors among which the first transistors are such that each first transistor comprises a channel in which a concentration of the same type of dopants as those present in the source and drain of said first transistor is greater than the concentration in the channel of each of the other transistors in said plurality of transistors of the same type of conductivity as said first transistor;

fabricate an identification circuit capable of determining a unique identifier of the electronic device starting from at least one intrinsic electrical characteristic of each of the first transistors, the value of which depends at least partly on the conductance of said first transistor.

The addition of these dopants into the channels of the first transistors has little impact on the other steps applied for making the electronic device and is therefore compatible with existing processes.

Fabrication of the first transistors may include the use of an implantation of dopants in the semiconductor to form active zones in each of the first transistors, with a dose of between about $5\times10^{11}$ and $5\times10^{12}$ at/cm$^2$ and an energy between about 0.5 and 20 keV, and advantageously between about 2 and 3 keV or even between about 2 keV and 10 keV (10 keV in the case of phosphorus dopants). The energy with which dopants are implanted may be adapted as a function of the implanted species and whether or not there is a protective layer present on the channels, the thickness of this protective layer possibly being more than about 10 nm.

The description also discloses a method of identifying an electronic device comprising a plurality of MOSFET transistors, among which each of the first transistors comprises a channel with higher level of doping than that in the channel of each of the other transistors in said plurality of transistors, comprising at least the following steps:

read the currents circulating in the identically biased first transistors;

compare said current values two by two, the results of these comparisons forming the unique identifier of the electronic device.

The description also discloses a method of identifying an electronic device comprising a plurality of MOSFET transistors among which the first transistors are such that each first transistor comprises a channel in which a concentration of the same type of dopants as those present in the source and drain of said first transistor is greater than the concentration in the channel of each of the other transistors in said plurality of transistors of the same type of conductivity as said first transistor, the first transistors forming several SRAM memory cells comprising at least one step to read an initial memory state of each of the SRAM memory cells formed by the first transistors, the initial memory states of said SRAM memory cells together forming the unique identifier of the electronic device.

BRIEF DESCRIPTION OF THE DRAWINGS

This invention will be better understood after reading the description of example embodiments given purely for information and that are in no way limitative, with reference to the appended drawings on which.

Identical, similar or equivalent parts of the different figures described below have the same numeric references to facilitate comparison between the different figures.

The different parts shown on the figures are not necessarily all at the same scale, to make the figures more easily understandable.

It must be understood that the different possibilities (variants and embodiments) are not mutually exclusive and that they can be combined with each other.

DETAILED PRESENTATION OF PARTICULAR EMBODIMENTS

Figure 1:
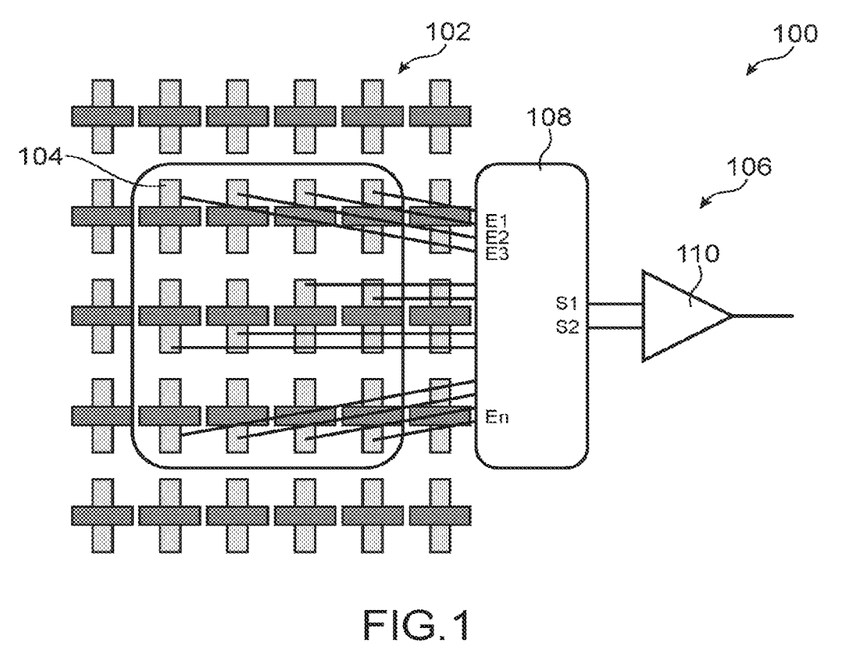
FIG. 1 represents part of an electronic device according to a first embodiment.

Refer to FIG. 1 that represents part of an electronic device 100 according to a first embodiment;

The electronic device 100 corresponds to an electronic chip or an integrated circuit made from a semiconductor on insulator type substrate, for example a silicon on insulator (SOI) substrate.

The electronic device 100 comprises a large number of fully-depleted MOSFET transistors 102, in this case of the Fully-Depleted Silicon On Insulator (FD-SOI) type, in other words comprising a channel formed in a very thin semiconducting layer formed on a buried dielectric.

Some of the transistors 102 of the electronic device 100, called first transistors 104, will be used to identify the electronic device 100. Each of these first transistors 104 comprises a channel in which the concentration of dopants of the same type as those present in the source and drain of said first transistor 104 is greater than the concentration of dopants in the channel of the each of the other transistors 102.

The electronic device 100 also comprises an identification circuit 106 to determine a unique identifier of the electronic device 100.

The identification circuit 106 comprises a multiplexer 108 provided with several inputs, in this case n inputs referenced E1-En, each connected to the drain or the source of one of the first transistors 104. The multiplexer 108 also comprises two outputs S1 and S2 on which the currents circulating in two of the first transistors 104 can be outputted.

Currents circulating between the drain and the source of the first transistors 104 are read by biasing these first transistors 104 identically. For example, the currents read may correspond to currents $I_{ON}$ of the first transistors 104, in other words the current circulating between the transistor drain and source when $V_{GS}$ (gate-source voltage)=$V_{DS}$ (drain-source voltage)=Valim (transistor power supply voltage). As a variant, the currents in the first transistors 104 can be read by biasing the first transistors 104 with voltages with values different from Valim.

The identification circuit 106 also comprises a comparator 110 comprising two inputs connected to two outputs of the multiplexer 108, capable of outputting a signal with a value that varies depending on the result of the comparison between the values of currents received at inputs to the comparator 110. On the example in FIG. 1, the comparator corresponds to a differential amplifier. Depending on whether the value of the current applied on a first of two inputs to the comparator 110 is greater than or less than the value of the current applied to a second of the two inputs to the comparator 110, the voltage output by the comparator 110 can be treated like a binary signal for which the value is equal to the power supply voltage to the comparator 110 represented by a binary '1', or a null value represented by a binary '0'.

Due to the multiplexer 108 and the comparator 110, the identification circuit 106 thus compares values of currents circulating in identically biased first transistors 104, two by two. The different values output by the comparator 110 for these different comparisons together form a binary number corresponding to the unique identifier of the electronic device 100.

On the example in FIG. 1, the identification circuit 106 is capable of making comparisons between $I_{ON}$ currents in twelve first transistors 104, therefore so that 66 current comparisons can be made. Therefore the identifier can correspond to a binary number that can have up to 66 bits when the identification circuit 106 is capable of detecting a stable difference between all measured current pairs. If errors occur, post-processing elements can correct these errors to be independent of them.

In the example in FIG. 1, the first transistors 104 are chosen from among transistors 102 such that they are not located at the edges of the device 100. As a result, only "local" variations can be considered (therefore related to stochastic and purely random phenomena) because the fabrication processes used are identical for all the first transistors 104. In this case, "edge effects" that can have an influence on transistor characteristics are eliminated. It also makes it possible to make an authentication based on a "challenge response" mechanism to securely authenticate the electronic device.

One example embodiment of FD-SOI type first transistors 104 is given with reference to FIGS. 2A to 2D. Only the main fabrication steps of this transistor 104 are described below.

Figure 2A:
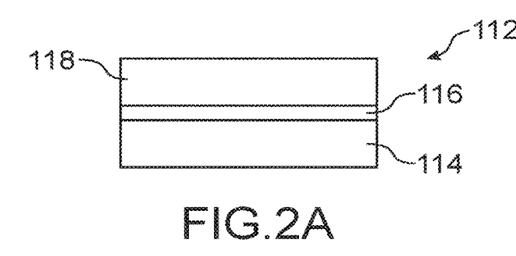
FIGS. 2A to 2D represent steps in the fabrication of a transistor used to make an identification within an electronic device according to one example embodiment.

The first transistors 104 are made from an SOI substrate 112 comprising a thick semiconducting layer 114, for example comprising silicon, forming the mechanical support for the substrate 112 (FIG. 2A). The SOI substrate 112 also comprises a buried dielectric layer 116, for example including $SiO_2$, placed on the thick layer 114. The SOI substrate 112 also comprises a thin semiconducting layer 118 placed on the buried dielectric layer 116 and that will be used to fabricate the active zones of the transistors 102. The thickness of the thin layer 118 may for example be between about 7 nm and 8 nm, or more generally less than about 20 nm or between about 5 nm and 20 nm, and the thickness of the buried dielectric layer 116 is for example about 25 nm. The FD-SOI nature of the first transistors 104 is obtained particularly due to this very small thickness of the thin layer 118. This small thickness of the thin layer 118 will also be sufficient to achieve proximity between the buried dielectric layer 116 and the dopants that will be implanted in the channel.

Figure 2B:
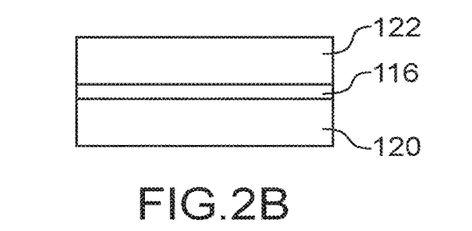

As shown on FIG. 2B, the thick layer 114 is doped in order to form the N or P wells 120 of the first transistors 104. The N or P well of the other transistors 102 are also formed during this step.

Very weak doping is then applied to the parts 122 of the thin layer 118 that will form the active zones of the first transistors 104. In this case this doping is obtained by implantation of dopants at very low dose, for example between about $5 \times 10^{11}$ and $5 \times 10^{12}$ at/cm$^2$, with low energy, for example between about 0.5 and 20 keV, and advantageously between about 2 and 10 keV or equal to about 10 keV. Thus, the concentrations of dopants obtained in these parts 122 of the thin layer 118 are for example between about $5 \times 10^{17}$ and $8 \times 10^{18}$ at/cm$^3$.

The first transistors 104 may be of the NMOS and/or the PMOS type (NMOS and PMOS when some of these first transistors 104 are of the NMOS type and the other first transistors 104 are of the PMOS type). The dopants implanted in the channels of the first transistors 104 have the same type of conductivity as these transistors. Thus, for an NMOS transistor, the implanted dopants are for example As and/or P doping species. For a PMOS transistor, the implanted dopants may for example be doping species of B and/or $BF_2$.

Figure 2C:
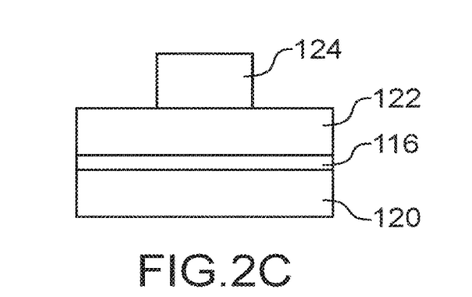

A gate 124 is then fabricated for each of the first transistors 104 on the parts 122 (FIG. 2C). The gates of the other transistors 102 are also formed during this step.

Figure 2D:
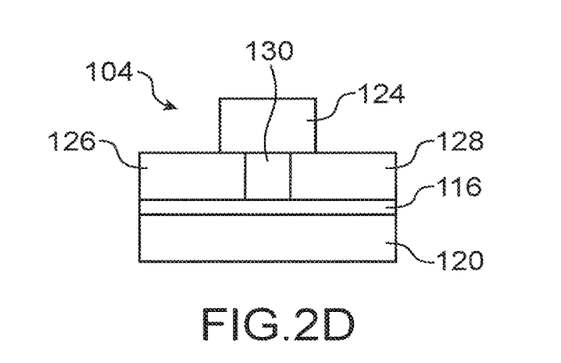

The source 126 and drain 128 of the first transistors 104 (and the source and drain of the other transistors 102) are then formed by doping, with much higher doping levels than that used to dope the channels 130 of the first transistors 104, around the slightly doped channels 130 of the first transistors 104 (FIG. 2D).

The first transistors 104 thus made are different from the other transistors 102 of the device 100 by their slightly doped channel, the channels of the other transistors 102 not being doped (apart from intrinsic P type doping, for example between about $1\times10^{15}$ at/cm$^3$ and $1\times10^{16}$ at/cm$^3$).

Advantageously, the gate length of the first transistors 104 can be less than the gate length of the other transistors 102 of the device 100 (for example equal to 22 nm), and for example less than or equal to about 20 nm. Therefore the effective length obtained of the channel will also be less than about 20 nm. This can increase the mismatch between transistors. Dopants added into the channel act as a potential well for free charges (the electronic current), and it is this current that passes through this potential well that increases the mismatch. A short gate length increases coupling of this current with the source and drain zones.

It is also possible that the parts 122 of the thin layer 118 designed to form the active zones of the first transistors 104 are thicker than the parts of the thin layer 118 that will form the active zones of the other transistors 102 of the device 100. For example, the thickness of the active zones of the other transistors 102 may be between about 7 nm and 8 nm, and the thickness of the active zones of the first transistors 104 may be greater than or equal to about 10 nm, or between about 10 nm and 20 nm. This can increase the ionisation energy of dopants present in the channels of the first transistors 104, and therefore increase the mismatch between transistors.

As a variant of the first embodiment described above, it is possible that the detection circuit 106 does not compare the values of currents circulating in the first transistors 104, and instead compares the values of one or several other electrical characteristics of the first transistors 104, for example the threshold voltage $V_T$ of the first transistors 104. In this case, the detection circuit 106 comprises an additional calculation element inserted between the multiplexer 108 and the comparator 110, connected to the outputs S1 and S2 from the multiplexer 108 and to the inputs to the comparator 110. This additional calculation element outputs the values of the required electrical characteristics on its outputs, for example the values of the threshold voltages of the transistors 104, calculated from the values of currents output from the multiplexer 108. For example, the threshold voltage of a first transistor 104 can be calculated by dichotomy by measuring the current $I_{ON}$ for different values of the voltage $V_G$ applied on the gate of this first transistor 104.

Comparisons of the values of currents circulating in the first transistors 104 can also be made at different biasing of the drain and gate of the first transistors 104.

Figure 3:
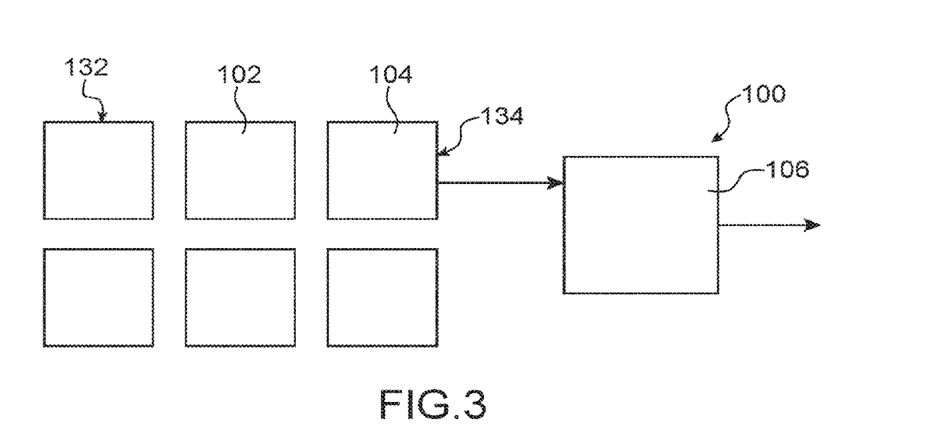
FIG. 3 diagrammatically represents an electronic device according to a second embodiment.

According to a second embodiment shown diagrammatically on FIG. 3, the electronic device 100 comprises SRAM memory cells 132 formed from MOSFET transistors 102 for example of the FD-SOI type. Some of these SRAM memory cells 132 will be used to identify the electronic device 100. These SRAM memory cells are referenced 134 on the diagram in FIG. 3. These SRAM memory cells 134 are formed by first transistors 104 that include a doped channel.

The initial memory states of these SRAM cells 134 are read by the detection circuit 106, these initial memory states forming the unique identifier of the electronic device 100.

The detection circuit 106 comprises for example elements that function like those described in the document by R. Maes et al. <<A Soft Decision Helper Data Algorithm for SRAM PUFs>>, Information Theory, 2009. ISIT 2009. IEEE International Symposium on, pp. 2101-2105. In this case, the information post-processing and the error correction code are implemented in a manner complying with a PUF based on SRAM.

In the embodiments described above, the electronic device 100 comprises FD-SOI type transistors 102. As a variant, the electronic device 100 may comprise bulk or FinFET type transistors 102.

Therefore in this case, the channels of these transistors 102 comprise dopants of the type opposite to those present in the source and drain of these transistors (an NMOS transistor having a P doped channel and a PMOS transistor having an N doped channel). The channels of the first transistors 104 also comprise dopants of the same type as the dopants present in the source and the drain of these first transistors in addition to dopants of the type opposite to those in the source and drain, which differentiates them from the other transistors 102 for which the channels comprise only dopants of the type opposite to those present in the source and the drain.

Thus, considering for example a set of bulk or FinFET type transistors 102, the NMOS transistors (either first transistors 104 or other transistors) comprise a P doped channel and N doped source and drain, and the PMOS transistors (either first transistors 104 or other transistors) comprise an N doped channel and P doped source and drain. Moreover, the channels of the NMOS type first transistors 104 comprise N type dopants, added in a distinct doping step in addition to the P type dopants present as a majority in these channels, and the channels of the PMOS type first transistors 104 comprise P type dopants added in a distinct doping step in addition to the N type dopants present as a majority in these channels,. This or these distinct doping steps may be implemented as described above for the fabrication of FD-SOI transistors.

The invention claimed is:
1. Electronic device comprising at least:
a plurality of MOSFET FD-SOI type transistors among which the first transistors are such that each first transistor comprises a channel in which a concentration of the same type of dopants as those present in the source and drain of said first transistor is greater than the concentration in the channel of each of the other transistors in said plurality of transistors of the same type of conductivity as said first transistor; and
an identification circuit configured to determine a unique identifier of the electronic device starting from at least one intrinsic electrical characteristic of each of the first transistors, the value of which depends at least partly on the conductance of said first transistor;
and in which the length of a gate of each of the first transistors is less than or equal to about 20 nm.

2. Electronic device according to claim 1, in which the identification circuit is configured to compare currents circulating in the first identically biased transistors two by two, the results of these comparisons being used to form the unique identifier of the electronic device.

3. Electronic device according to claim 2, in which the identification circuit comprises at least:
a multiplexer comprising several inputs, each connected to the drain or the source of one of the first transistors, and two outputs; and a comparator comprising two inputs connected to two outputs from the multiplexer, configured to output a signal with a value that varies depending on the result of the comparison between the values of currents applied on comparator inputs.

4. Electronic device according to claim 1, in which:
the first transistors form several SRAM memory cells, and
the identification circuit is configured to read an initial memory state of each of the SRAM memory cells formed by the first transistors, the initial memory states of said SRAM memories together forming the unique identifier of the electronic device.

5. Electronic device according to claim 1, in which said concentration of dopants of the same type as those present in the source and drain of said first transistor is between about $5 \times 10^{17}$ and $8 \times 10^{18}$ at/cm$^3$.

6. Electronic device according to claim 1, in which the length of the gate of each first transistor is less than the length of the gate of each of the other transistors.

7. Electronic device according to claim 1, in which the thickness of the active zone of each of the first transistors is higher than the thickness of the active zone of each of the other transistors.

8. Electronic circuit according to claim 7, in which the thickness of said active zone of each first transistor is between about 5 μm and 20 μm.

9. Method of making an electronic device comprising at least the following steps:
fabricate a plurality of MOSFET FD-SOI type transistors among which the first transistors are such that each first transistor comprises a channel in which a concentration of the same type of dopants as those present in the source and drain of said first transistor is greater than the concentration in the channel of each of the other transistors in said plurality of transistors of the same type of conductivity as said first transistor; and such that the length of a gate of each first transistor is less than or equal to about 20 nm
fabricate an identification circuit configured to determine a unique identifier of the electronic device starting from at least one intrinsic electrical characteristic of each of the first transistors, the value of which depends at least partly on the conductance of said first transistor.

10. Method according to claim 9, in which fabrication of the first transistors includes the use of an implantation of dopants in the semiconductor to form active zones in each of the first transistors, with a dose of between about $5 \times 10^{11}$ and $5 \times 10^{12}$ at/cm$^2$ and an energy between about 0.5 and 20 keV.

11. Method of identifying an electronic device comprising a plurality of MOSFET FD-SOI type transistors among which the first transistors are such that each first transistor comprises a channel in which a concentration of the same type of dopants as those present in the source and drain of said first transistor is greater than the concentration in the channel of each of the other transistors in said plurality of transistors of the same type of conductivity as said first transistor; and such that the length of a gate of each first transistor is less than or equal to about 20 nm, comprising at least the following steps:
read the currents circulating in the identically biased first transistors;
compare said current values two by two, the results of these comparisons forming the unique identifier of the electronic device.

12. Method of identifying an electronic device comprising plurality of MOSFET FD-SOI type transistors among which first transistors are such that each first transistor comprises a channel in which a concentration of the same type of dopants as those present in the source and drain of said first transistor is greater than the concentration in the channel of each of the other transistors in said plurality of transistors of the same type of conductivity as said first transistor; and such that the length of a gate of each first transistor is less than or equal to about 20 nm, the first transistors forming several SRAM memory cells:
comprising at least one step to read an initial memory state of each of the SRAM memory cells formed by the first transistors, the initial memory states of said SRAM memory cells together forming the unique identifier of the electronic device.

* * * * *